(12) United States Patent
Kim et al.

(10) Patent No.: US 12,555,641 B2
(45) Date of Patent: Feb. 17, 2026

(54) MEMORY DEVICE FOR PERFORMING A PROGRAM OPERATION BASED ON OPERATION STAGE AND OPERATING METHOD THEREOF

(71) Applicant: SK hynix Inc., Icheon-si (KR)

(72) Inventors: Jong Woo Kim, Icheon-si (KR); Young Cheol Shin, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 218 days.

(21) Appl. No.: 18/333,366

(22) Filed: Jun. 12, 2023

(65) Prior Publication Data

US 2024/0194275 A1 Jun. 13, 2024

(30) Foreign Application Priority Data

Dec. 8, 2022 (KR) .................. 10-2022-0170808

(51) Int. Cl.
  *G11C 16/34* (2006.01)
  *G11C 16/04* (2006.01)
  *G11C 16/10* (2006.01)
  *G11C 16/26* (2006.01)

(52) U.S. Cl.
  CPC ...... *G11C 16/3427* (2013.01); *G11C 16/0483* (2013.01); *G11C 16/10* (2013.01); *G11C 16/26* (2013.01); *G11C 16/3459* (2013.01)

(58) Field of Classification Search
  None
  See application file for complete search history.

(56) References Cited

U.S. PATENT DOCUMENTS

2014/0063939 A1* 3/2014 Marcu .................. G11C 11/5628
365/185.18

FOREIGN PATENT DOCUMENTS

KR   101487524 B1   1/2015
KR   1020160087431 A   7/2016

* cited by examiner

*Primary Examiner* — Alfredo Bermudez Lozada
(74) *Attorney, Agent, or Firm* — WILLIAM PARK AND ASSOCIATES LTD.

(57) ABSTRACT

A memory device includes a memory cell array including a plurality of pages; a peripheral circuit for performing a program operation; and a control logic for controlling the peripheral circuit to, when a program command for a first page among the plurality of pages and a plurality of page data are received, program a second page based on one page data among the plurality of page data, and program the first page based on other page data, according to a stage of the program operation.

18 Claims, 7 Drawing Sheets

600

| Program Operaton Stage | data to be program/read | location | Program type | Program sequence |
|---|---|---|---|---|
| start stage | MSB data (WL1/PG1) | LSB data (WL2/PG2) | TLC (2 PGM) | 1 |
| | CSB data (WL1/PG1) | MSB data (WL1/PG1) | MLC | 2 |
| | LSB data (WL1/PG1) | LSB data (WL1/PG1) | | |
| intermediate stage | MSB data (WL2/PG2) | LSB data (WL3/PG3) | TLC (2 PGM) | 3 |
| | CSB data (WL2/PG2) | MSB data (WL2/PG2) | TLC (8 PGM) | 4 |
| | LSB data (WL2/PG2) | CSB data (WL2/PG2) | | |
| | ⋮ | ⋮ | ⋮ | ⋮ |
| | MSB data (WLn−1/PGn−1) | LSB data (WLn/PGn) | TLC (2 PGM) | 2n−3 |
| | CSB data (WLn−1/PGn−1) | MSB data (WLn−1/PGn−1) | TLC (8 PGM) | 2n−2 |
| | LSB data (WLn−1/PGn−1) | CSB data (WLn−1/PGn−1) | | |
| end stage | MSB data (WLn/PGn) | SLC data (WLn+1/PGn+1) | SLC | 2n−1 |
| | CSB data (WLn/PGn) | MSB data (WLn/PGn) | TLC (8 PGM) | 2n |
| | LSB data (WLn/PGn) | CSB data (WLn/PGn) | | |

FIG. 6

| Program Operaton Stage | data to be program/read | location | Program type | Program sequence |
|---|---|---|---|---|
| start stage | MSB data (WL1/PG1) | LSB data (WL2/PG2) | TLC (2 PGM) | 1 |
| | CSB data (WL1/PG1) | MSB data (WL1/PG1) | MLC | 2 |
| | LSB data (WL1/PG1) | LSB data (WL1/PG1) | TLC (2 PGM) | 3 |
| intermediate stage | MSB data (WL2/PG2) | LSB data (WL3/PG3) | TLC (8 PGM) | 4 |
| | CSB data (WL2/PG2) | MSB data (WL2/PG2) | | |
| | LSB data (WL2/PG2) | CSB data (WL2/PG2) | | |
| | ... | ... | ... | ... |
| | MSB data (WLn-1/PGn-1) | LSB data (WLn/PGn) | TLC (2 PGM) | 2n-3 |
| | CSB data (WLn-1/PGn-1) | MSB data (WLn-1/PGn-1) | TLC (8 PGM) | 2n-2 |
| | LSB data (WLn-1/PGn-1) | CSB data (WLn-1/PGn-1) | | |
| end stage | MSB data (WLn/PGn) | SLC data (WLn+1/PGn+1) | SLC | 2n-1 |
| | CSB data (WLn/PGn) | MSB data (WLn/PGn) | TLC (8 PGM) | 2n |
| | LSB data (WLn/PGn) | CSB data (WLn/PGn) | | |

600

MEMORY DEVICE FOR PERFORMING A PROGRAM OPERATION BASED ON OPERATION STAGE AND OPERATING METHOD THEREOF

CROSS-REFERENCE TO RELATED APPLICATION

The present application claims priority under 35 U.S.C. § 119(a) to Korean patent application number 10-2022-0170808 filed on Dec. 8, 2022, in the Korean Intellectual Property Office, the entire disclosure of which is incorporated by reference herein.

BACKGROUND

1. Technical Field

The present disclosure generally relates to an electronic device, and more particularly, to a memory device and an operating method thereof.

2. Related Art

A storage device is a device which stores data under the control of a host device such as a computer or a smart phone. The storage device may include a memory device for storing data and a memory controller for controlling the memory device.

The memory device may include pages connected to word lines. As the spacing or "pitch" between word lines decreases, electrical signals carried word lines can create electrical interference on adjacent and nearby word lines. The electrical interference degrades a reliability of data stored in a page. A prior art method of reducing word-line to word-line interference alternates the transmission of programming signals over adjacent word lines. Unfortunately, alternating the transmission of signals over word lines slows programming speed. A system problem may therefore occur because programming speed must be decreased, which can cause a programming bottleneck. Accordingly, a technique for solving these problems is required.

SUMMARY

Embodiments disclosed herein reduce or prevent word-line to word-line electrical interference. In accordance with an aspect of the present disclosure, there is provided a memory device comprising a memory cell array including a plurality of pages; a peripheral circuit configured to perform a program operation; and a control logic configured to control the peripheral circuit to, when a program command for a first page among the plurality of pages and a plurality of page data are received, program a second page based on one page data among the plurality of page data, and program the first page based on other page data, according to a stage of the program operation.

In accordance with another aspect of the present disclosure, there is provided a method of operating a memory device, the method including: receiving a program command and receiving from a memory controller, first to third page data for a first page; programming a second page corresponding to a next page of the first page, based on the first page data; and programming the first page, based on the second page data and the third page data.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 6 is a table, illustrating a program operation and map information for each stage in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
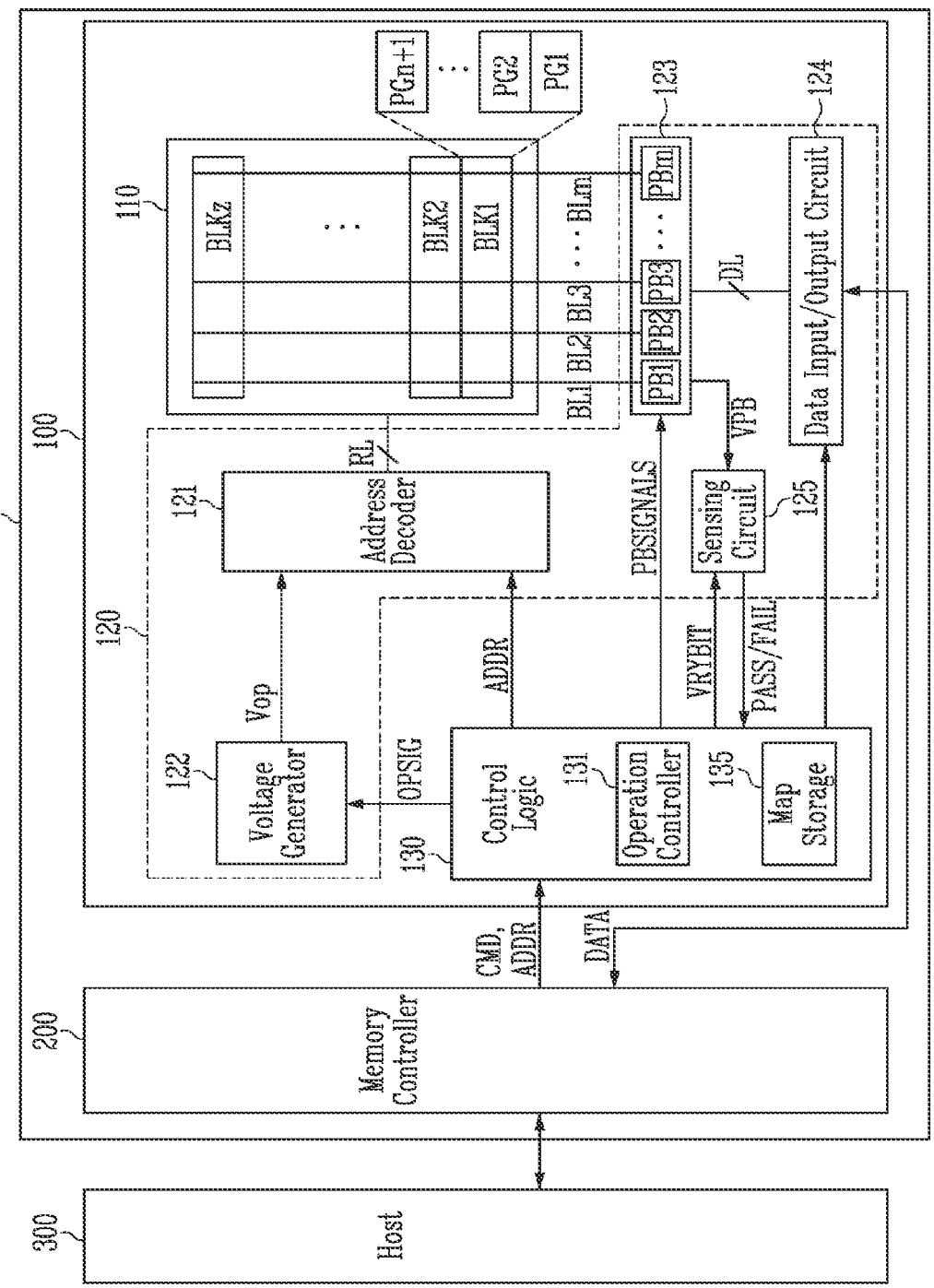
FIG. 1 is a diagram illustrating a memory device in accordance with an embodiment of the present disclosure.

FIG. 1 is a diagram illustrating a memory device in accordance with an embodiment of the present disclosure.

FIG. 1 depicts a host 300 operatively coupled to a storage device 1000 comprising a memory controller 200 and a memory device 100. The host 300 may request the storage device 1000 to store, read or erase data. The storage device 1000 may be mounted in the host 300, or may be implemented as an external electronic device of the host 300. The host 300 may be one of various electronic devices such as a desktop computer, a laptop computer, a mobile phone, a smartphone, a game console, a television (TV), a tablet computer, and a wearable device.

The storage device 1000 may include a memory device 100 and a memory controller 200. The memory controller 200 may control the memory device 100, which may perform specific operations under the control of the memory controller 200. The memory device 100 and the memory controller 200 may be connected to each other through a bus or a channel, which may be a conductor or a group of conductors, that serves as a common connection for two or more circuits or devices.

In an embodiment, the memory device 100 may include a memory cell array 110, a peripheral circuit 120, and a control logic 130. The memory cell array 110 may include a plurality of memory blocks, BLK1 to BLKz. The memory blocks BLK1 to BLKz may be fabricated in the same semiconductor structure. For the same of convenience, a first memory block BLK1 will be described.

FIG. 1 shows that the first memory block BLK1 may include a plurality of pages PG1 to PGn+1. Each page PG1 to PGn+1 may include a plurality of memory cells. Each page PG1 to PGn+1 may be a unit of memory, in which a programming operation or a read operation is performed. Each memory block BLK1 to BLKz may be a unit of memory in which an erase operation is performed.

The first memory block BLK1 may be connected to an address decoder 121 through a row line RL. The first memory block BLK1 may be connected to a plurality of page buffers PB1 to PBm through a plurality of bit lines BL1 to BLm. The row line RL may include a drain select line, a word line, a source select line, and a source line, not shown in FIG. 1. Since the memory blocks BLK1 to BLKz are substantially identical, the description of the first memory block BLK1 is applicable to the other memory blocks.

The peripheral circuit 120 may perform a program operation or a read operation on a specific page among the plurality of pages PG1 to PGn+1 included in the memory cell array 110 according to a control signal received from the control logic 130. For example, the control signal may include at least one of an operation signal OPSIG, a page buffer control signal PBSIGNALS, an allow bit signal VRYBIT, and an address ADDR.

In an embodiment, the peripheral circuit 120 may include the address decoder 121, a voltage generator 122, a page buffer circuit 123, a data input/output circuit 124, and a sensing circuit 125.

The address decoder 121 may be connected to the memory cell array 110 through the row lines RL. The address decoder 121 may apply an operating voltage Vop provided from the voltage generator 122 to a storage area of the memory cell array 110, which is selected according to an address ADDR received from the control logic 130.

The voltage generator 122 may generate various kinds of operating voltages Vop by using power supplied to the memory device 100 from an external voltage source. Specifically, when an operation signal OPSIG is received from the control logic 130, the voltage generator 122 may generate an operating voltage Vop corresponding to the operation signal OPSIG. The voltage generator 122 may transfer the operation signal OPSIG to the address decoder 121.

For example, the operating voltage Vop may include at least one of a program voltage, a program pass voltage, a program verify voltage, a program verify pass voltage, a read voltage, a read pass voltage, an erase voltage, and the like, the magnitudes of each voltage being different.

The page buffer circuit 123 may temporarily store page data DATA and transfer the temporarily-stored page data DATA to the memory cell array 110. The page data DATA may be data that is stored in units of pages. The page buffer circuit 123 may include the plurality of page buffers PB1 to PBm, each of which is sized to store a page of data. Each page buffer PB1 to PBm may be connected to a corresponding bit line among the plurality of bit lines BL1 to BLm. Each of the page buffers PB1 to PBm may be connected to a memory cell through a corresponding bit line BL1 to BLm. For example, when the page buffer signal PBSIGNALS is received from the control logic 130, each of the plurality of page buffers PB1 to PBm may apply, to a corresponding bit line BL1 to BLm, a voltage corresponding to the page data DATA, which is selected to be either a program-allow voltage or a program-inhibit voltage.

The data input/output circuit 124 may be connected to the page buffer circuit 123 through a data line DL. The data input/output circuit 124 may be connected to the memory controller 200.

The data input/output circuit 124 may receive page data DATA from the memory controller 200, and temporarily store the page data DATA. The data input/output circuit 124 may subsequently transmit the temporarily stored page data DATA into the page buffer circuit 123.

The sensing circuit 125 may generate a reference voltage internally, in response to the allow bit signal VRYBIT received from the control logic 130. The sensing circuit 125 may generate a pass signal PASS or a fail signal FAIL, by comparing the reference voltage with a sensing voltage VPB received from the page buffer circuit 123. The sensing circuit 125 may output either the pass signal PASS or the fail signal FAIL to the control logic 130. The pass signal PASS may represent that a program operation passed, i.e., succeeded. The fail signal FAIL may represent that the program operation failed, i.e., did not succeed.

The control logic 130 may be embodied as combinational and sequential logic devices or, an equivalently-programmed processor. The control logic 130 may control the peripheral circuit 120 to execute a program operation to or within the memory cell array 110 according to a program command CMD, and an address ADDR, received by the control logic 130 from the memory controller 200. For example, when the program command CMD and the address ADDR are received, the control logic 130 may control the peripheral circuit 120 to perform a program operation on, i.e., store data in, a storage area corresponding to the address ADDR.

In an embodiment, the control logic 130 may include an operation controller 131 and a map storage 135.

As used herein, the word "stage" refers to, and should be construed as comprising one of a series, i.e., a time, a time period, an event, or a step or steps of, a process, method or procedure. A stage may be or may have a distinct or certain specification or limit. A stage may be relative, i.e., it may have a relation to or connection with or necessary dependence on another thing. By way of example, an "early stage" or a "start stage" of a process may be a time, time period, event or step, at or near the beginning of the process. A "late stage" or an "end stage" of a process may be a time, time period, event or step, at or near the termination of a process.

The word "distributively" is the adverb form of distribute. As used herein, "distributively" should be construed as dividing data evenly, substantially evenly, or not perfectly even.

When a program command CMD is received from the memory controller 200, the operation controller 131 may control the peripheral circuit 120 to perform a program operation by which data may be stored somewhere in the memory cell array 110. The operation controller 131 may control the peripheral circuit 120 to cause or effectuate perform a program operation, using a program method, and according to a stage of the program operation. The operation controller 131 may control the peripheral circuit 120 to perform a program operation to distributively store page data for one page, in several pages. The operation controller 131 may store in the map storage 135, information on the locations of page data that is distributively stored in the memory cell array 110. Stated another way, the map storage 135 may be programmed by the operation controller 131 to record or store locations in the memory cell array 110 where various shares or portions of data for one page, can be found in other pages.

The map storage 135 may store map information. The map information may be an address of a page, or a representation of an address of a page, where each piece of page data DATA is stored. The map information may therefore be considered to be relationships of page data DATA to addresses ADDR where data for one page is located in pages.

Hereinafter, embodiments of the present disclosure will be described in more detail with reference to the accompanying drawings.

Figure 2:
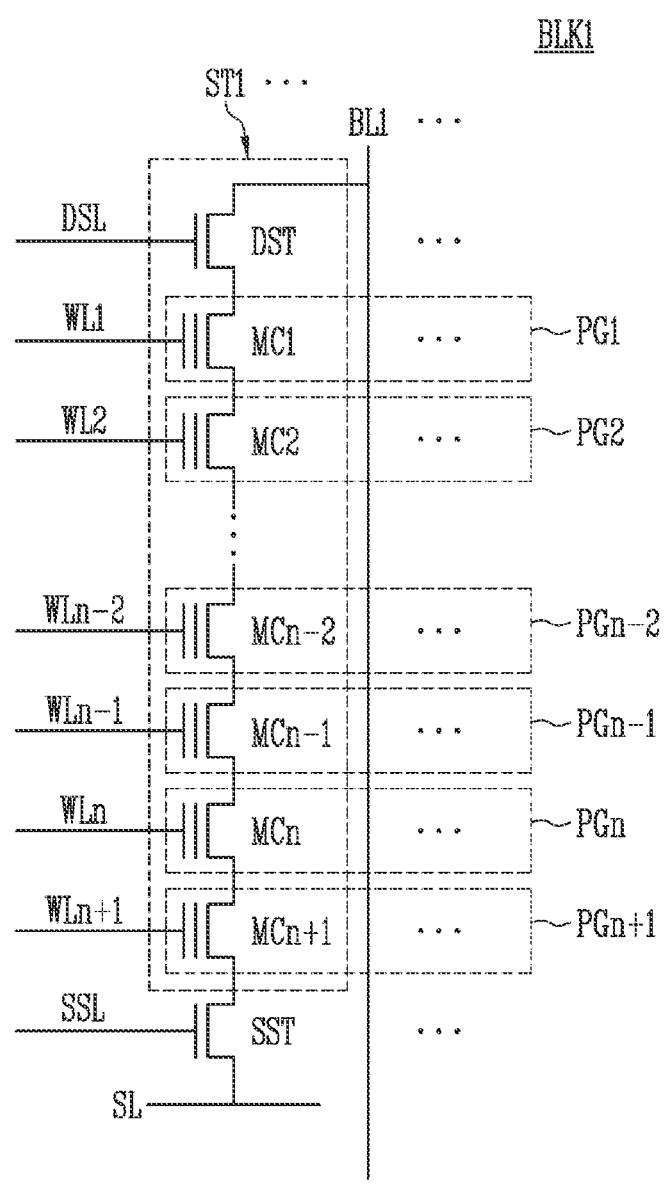
FIG. 2 is a diagram illustrating a word line and a page in accordance with an embodiment of the present disclosure.

FIG. 2 is a diagram illustrating a word line and a page in accordance with an embodiment of the present disclosure.

Referring to FIG. 2, a first memory block BLK1 may be divided in units of pages. That is, the first memory block BLK1 may include a plurality of pages PG1 to PGn+1. Description of the first memory block BLK1 of FIG. 2 may be applied to other memory blocks BLK2 to BLKz of FIG. 1. " . . . " in FIG. 2 may indicate that the same component is omitted.

Each of pages PG1 to PGn+1 may be connected to a corresponding word line among word lines WL1 to WLn+1. Specifically, a first page PG1 will be described an example. The first page PG1 may include a plurality of first memory cells MC1. The first memory cell MC1 may be a semiconductor element capable of storing data. The first memory cell MC1 may represent a minimum unit for storing data. Gates of the plurality of first memory cells MC1 may be connected to a first word line WL1. Descriptions of the first page PG1 may be equally applied to the other pages PG2 to PGn+1.

In an embodiment, the first memory cell MC1 may be implemented as a transistor including a gate, an insulating layer, and a floating gate. For example, when a program voltage is applied to the gate of the first memory cell MC1, electrons may be stored in the floating gate of the first memory cell MC1 through a tunneling phenomenon. A threshold voltage of the first memory cell MC1 may vary according to an amount of electrons stored in the floating gate. The threshold voltage of the first memory cell MC1 may belong to one program state among a plurality of program states having different voltage ranges. The program state of the first memory cell MC1 may represent a value of data stored in the first memory cell MC1. Meanwhile, descriptions of the first memory cells MC1 may be applied to the other memory cells MC2 to MCn+1.

Meanwhile, the memory block may be divided in units of strings. A plurality of strings may be configured in the same manner, and therefore, a first string ST1 will be representatively described as an example. The first string ST1 may include a source select transistor SST, a plurality of memory cells MC1 to MCn+1, and a drain select transistor DST. The first string ST1 may be connected to a first bit line BL1 and a source line SL. For example, a first terminal of the first string ST1 may be connected to the first bit line BL1, and a second terminal of the first string ST1 may be connected to the source line SL. One bit line may be individually connected to a first terminal of each of different strings, and the source line SL may be commonly connected to second ends of the different strings.

The source select transistor SST, the plurality of memory cells MC1 to MCn+1, and the drain select transistor DST may be connected in series to each other. A gate of the source select transistor SST may be connected to a source select line SSL, and a gate of the drain select transistor DST may be connected to a drain select line DSL. A source of the source select transistor SST may be connected to the source line SL, and a drain of the drain select transistor DST may be connected to the first bit line BL1. The memory cells MC1 to MCn+1 included in the first string ST1 may be connected in series between the source select transistor SST and the drain select transistor DST.

Figure 3:
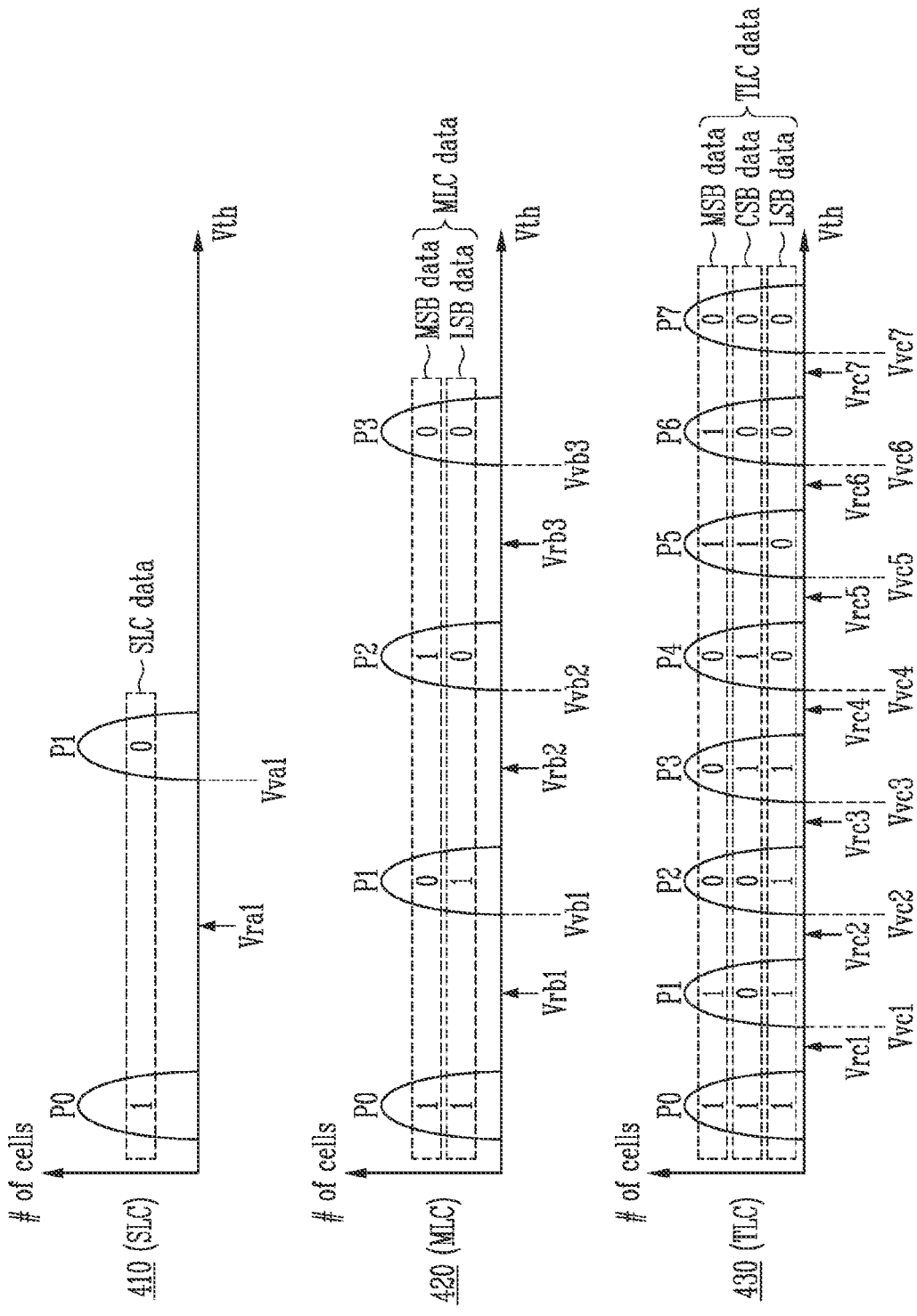
FIG. 3 is a diagram illustrating a data storage method in accordance with an embodiment of the present disclosure.

FIG. 3 is a diagram illustrating a data storage method in accordance with an embodiment of the present disclosure. The horizontal axis of the graph represents the threshold voltage Vth, and the vertical axis of the graph represents the number of memory cells # of cells.

Referring to FIG. 3, a program operation in accordance with an embodiment of the present disclosure may be performed on units of pages or on units of word lines. A page on which the program operation is performed may store at least one page data. The page data may be a set of data stored in memory cells of the page.

In accordance with an embodiment, according to a stage of the program operation, the program operation may be performed using a Triple Level Cell (TLC) method 430, or be performed using the TLC method 430 together with one of a Single Level Cell (SLC) method 410 and a Multi-Level Cell (MLC) method 420.

The stage of the program operation may be a program start stage, a program intermediate stage, or a program end stage. When the program operation of storing data is continuously performed, the program start stage may be a stage of performing an initial program operation. The program intermediate stage may be a stage of performing a program operation between the program start stage and the program end stage. The program end stage may be a stage of performing a last program operation.

The SLC method 410 may be a method of storing one-bit data in one memory cell, the MLC method 420 may be a method of storing two-bit data in one memory cell, and the TLC method 430 may be a method of storing three-bit data in one memory cell.

For example, when the program operation is performed on the page by using the SLC method, the page may store one bit page data. By appropriately charging a floating gate as described above, a memory cell may store one-bit data, having values 0 and 1, to distinguish two program states P0 and P1 from each other. The one-page data may be designated as SLC data. In the case of the SLC programming method 410, a program verify operation may be performed using one verify voltage, Vva1. When a read operation is performed using one read voltage Vra1, values of the SLC data may be distinguished from each other.

When the program operation is performed on the first page PG1 by using the MLC method 420, the first page PG1 may store two-bit page data. A memory cell may store two-bit data. The two-bit data may have values 11 to 00 for distinguishing four program states P0 to P3 from each other. Since the two-bit page data requires two bits (binary digits), two-bit data may include Least Significant Bit (LSB) data and Most Significant Bit (MSB) data.

Two page data may be designated as MLC data. In the case of the MLC method 420, a program verify operation may be performed using three verify voltages Vvb1 to Vvb3. When a read operation is performed using three read voltages Vrb1 to Vrb3, values of the MLC data may be distinguished from each other.

When the program operation is performed on the first page PG1 by using the TLC method 430, the first page PG1 may store three page data. A memory cell may store three-bit data. The three-bit data may have values 111 to 000 for distinguishing eight program states P0 to P7 from each other. The three page data may include LSB data, Central Significant Bit (CSB) data, and MSB data. Three page data may be designated as TLC data. Meanwhile, in the case of the TLC method 430, a program verify operation may be performed using seven verify voltages Vvc1 to Vvc7. When a read operation is performed using seven read voltages Vrc1 to Vrc7, values of the TLC data may be distinguished from each other.

Figure 4:
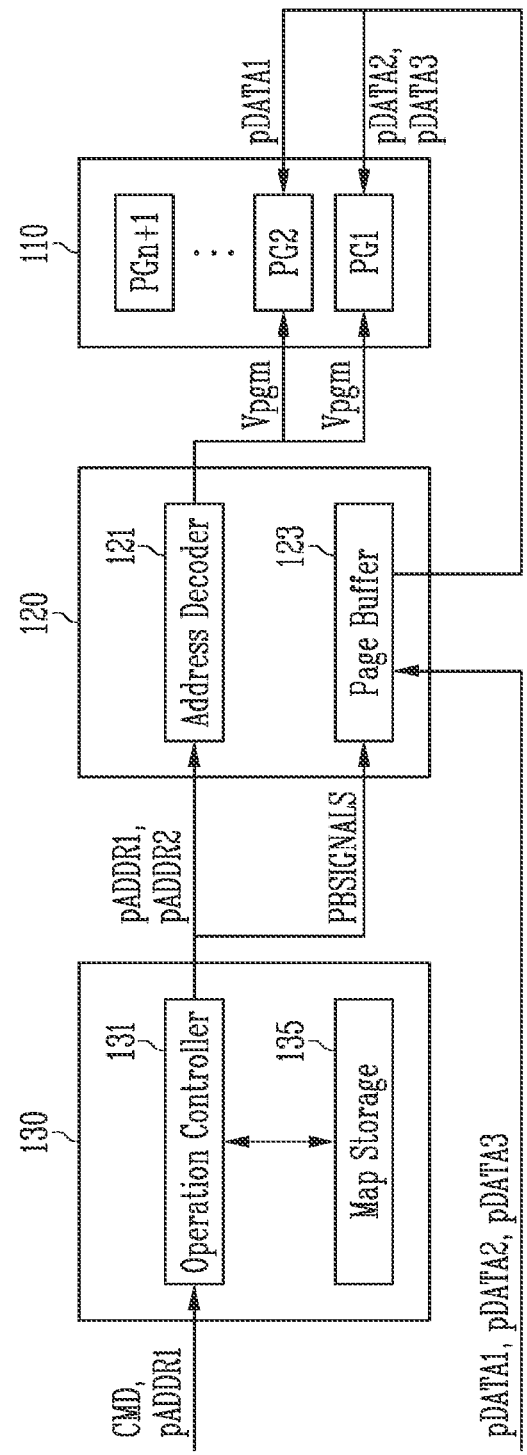
FIG. 4 illustrates a configuration of a memory device in accordance with an embodiment of the present disclosure.

FIG. 4 is a diagram illustrating a configuration of the memory device 100 in accordance with an embodiment of the present disclosure.

Referring to FIG. 4, the memory device 100 may include a memory cell array 110, a peripheral circuit 120, and a control logic 130. The memory cell array 110 may include a plurality of pages PG1 to PGn+1. The peripheral circuit 120 may include an address decoder 121 and a page buffer circuit 123. The control logic 130 may include an operation controller 131 and a map storage 135. In FIG. 4, portions overlapping with those described above in FIG. 1 and the like will be omitted.

The memory device 100 may receive, from an external device not shown in the figure, a program command CMD, a first page address pADDR1, and a plurality of page data pDATA1 to pDATA3. The external device may be memory controller.

The operation controller 131 may receive a program command CMD and the first page address pADDR1. The page buffer circuit 123 may sequentially receive the plurality of page data pDATA1 to pDATA3. The first page address pADDR1 may be an address representing a first page PG1. The program command CMD may be a command instructing the peripheral circuit 120 to perform a program operation, using the TLC method. The plurality of page data pDATA1 to pDATA3 may include MSB data, CSB data, and LSB data, which constitute one TLC data.

The operation controller 131 may control the peripheral circuit 120 to distributively store the plurality of page data pDATA1 to pDATA3 in the first page PG1 and a second page PG2. The second page PG2 is a page closest (or most adjacent) to the first page PG1, and may be a next page of the first page PG1.

In an embodiment, the operation controller 131 may control the peripheral circuit 120 to perform a first program operation of storing first page data pDATA1 in the second page PG2 and to perform a second program operation of storing second page data pDATA2 and third page data pDATA3 in the first page PG1. For example, the first page data pDATA1 may be the MSB data, the second page data pDATA2 may be the CSB data, and the third page data pDATA3 may be the LSB data.

For example, the operation controller 131 may transmit, to the address decoder 121, a second page address pADDR2 representing the second page PG2, and transmit, to the page buffer circuit 123, a page buffer control signal PBSIGNALS for controlling the page buffer circuit 123 to apply a voltage corresponding to the first page data pDATA1. The address decoder 121 may apply a program voltage Vpgm to a second word line connected to the second page PG, and the page buffer circuit 123 may apply the voltage corresponding to the first page data pDATA1 to a plurality of bit lines connected to the second page PG2. The voltage applied to the plurality of bit lines may be one of a program allow voltage and a program inhibit voltage.

Also, the operation controller 131 may transmit, to the address decoder 121, the first page address pADDR1 representing the first page PG1, and transmit, to the page buffer circuit 123, the page buffer control signal PBSIGNALS for controlling the page buffer circuit 123 to apply a voltage corresponding to the second page data pDATA2 and the third page data pDATA3. The address decoder 121 may apply a program voltage Vpgm to a first word line connected to the first page PG1, and the page buffer circuit 123 may apply the voltage corresponding to the second page data pDATA2 and the third page data pDATA3 to a plurality of bit lines connected to the first page PG1. The voltage applied to the plurality of bit lines may be one of the program allow voltage and the program inhibit voltage.

Also, the operation controller 131 may store, in the map storage, information on a page in which page data is stored as map information. For example, the map information may include mapping information representing that the first page data pDATA1 is stored in the second page PG2. The map information may include mapping information representing that the second page data pDATA2 and the third page data pDATA3 are stored in the first page PG1.

In an embodiment, each of the first program operation and the second program operation may be one of a program operation using the SLC method, a program operation using the MLC method, a primary program operation using the TLC method, and a secondary program operation using the TLC method.

In an embodiment, when the program command CMD is received, the operation controller 131 may determine a program method of each of the first program operation and the second program operation according to a stage of the program operation.

In an embodiment, the operation controller 131 may determine a stage of the program operation by using flag information received from the memory controller 200. The flag information is information representing a program start stage, a program intermediate stage, and a program end stage. The flag information may be included in the program command CMD, or exist as information separate from the program command CMD.

In an embodiment, when the stage of the program operation is the program start stage, the operation controller 131 may determine the first program operation to be performed on the second page PG2 as the primary program operation using the TLC method, and determine the second program operation to be performed on the first page PG1 as the program operation using the MLC method.

In an embodiment, when the stage of the program operation is the program intermediate stage, the operation controller 131 may determine the first program operation to be performed on the second page PG2 as the primary program operation using the TLC method, and determine the second program operation to be performed on the first page PG1 as the secondary program operation using the TLC method. The primary program operation using the TLC method and the secondary program operation using the TLC method will be described later.

In an embodiment, when the stage of the program operation is the program end stage, the operation controller 131 may determine the first program operation to be performed on the second page PG2 as the program operation using the SLC method, and determine the second program operation to be performed on the first page PG1 as the secondary program operation using the TLC method.

Figure 5:
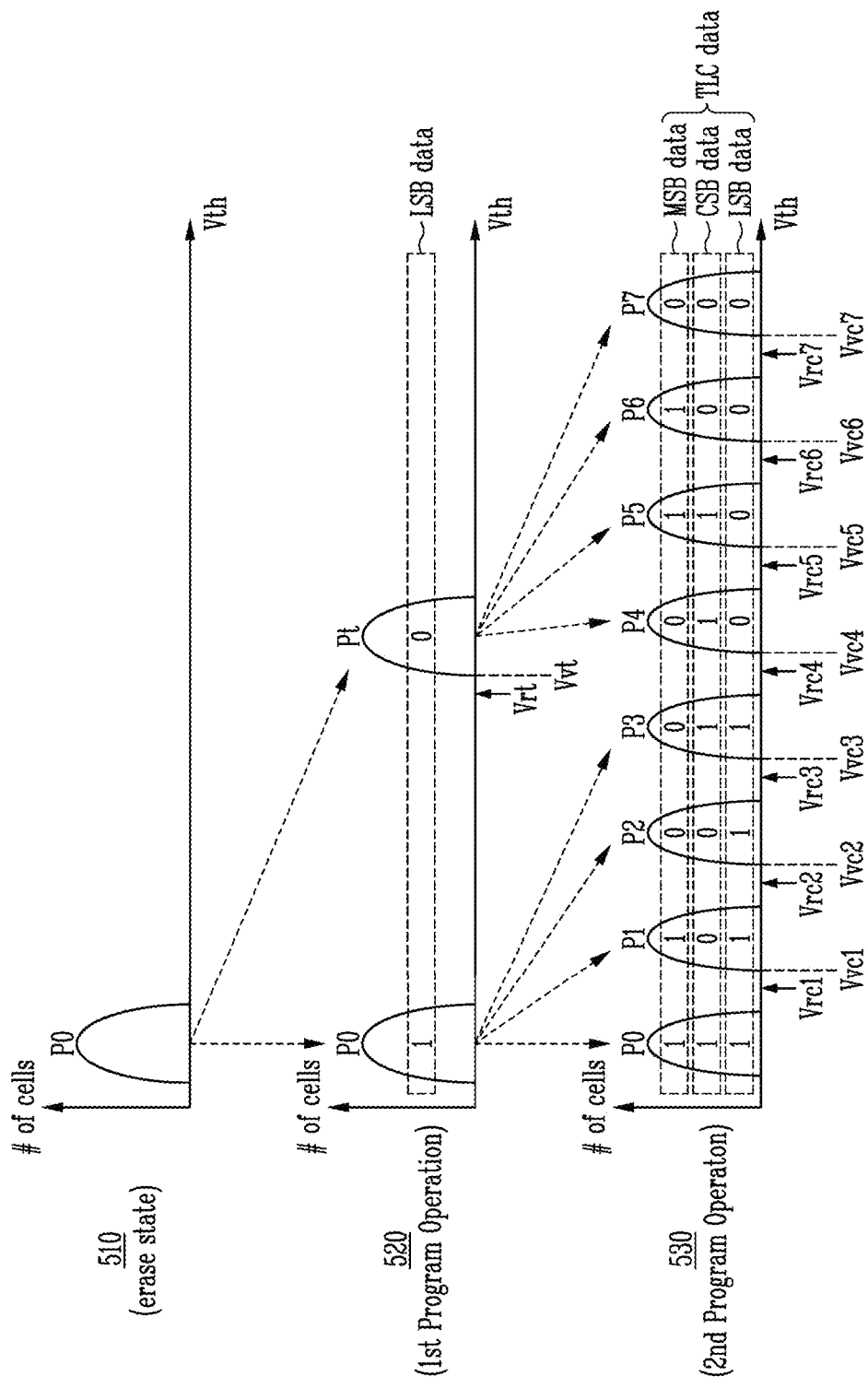
FIG. 5 illustrates program operation in accordance with an embodiment of the present disclosure.

FIG. 5 is a diagram illustrating a program operation in accordance with an embodiment of the present disclosure. FIG. 5 illustrates primary and secondary program operations using the TLC method.

Referring to FIGS. 4 and 5, the operation controller 131 in accordance with the present disclosure may control the peripheral circuit 120 to sequentially perform a primary program operation 520 using the TLC method and a secondary program operation 530 using the TLC method on a page including memory cells 510 in an erase state. The erase state may be a zeroth program state P0.

The operation controller 131 may control the peripheral circuit 120 to perform the primary program operation 520 using the TLC method such that LSB data is stored in one page, and then perform the secondary program operation 530 using the TLC method such that MSB data and CSB data are stored in one page.

In an embodiment, the operation controller 131 may control the peripheral circuit 120 to perform the primary program operation 520 of storing LSB data in one page.

Specifically, under the control of the operation controller 131, the peripheral circuit 120 may perform the primary program operation 520 such that memory cells to store a first value (e.g., 0) of the LSB data have an intermediate program state Pt, and perform a program verify operation using an intermediate verify voltage Vvt. Memory cells to store a second value (e.g., 1) of the LSB data may have the zeroth program state P0.

For example, the operation controller 131 may control the peripheral circuit 120 to repeatedly perform a program pulse operation and a program verify operation until threshold voltages of memory cells having, as a target, a value of the LSB data, which is 0, become equal to or higher than the intermediate verify voltage Vvt. The program pulse operation may be an operation of applying a program voltage to a word line connected to a page, applying a program pass voltage to the other word lines, applying a program allow voltage to bit lines connected to the memory cells having, as a target, a value of the LSB data, which is 0, and applying a program inhibit voltage to bit lines connected to memory cells having as a target, a value of the LSB data, which is 1. A level of the program voltage may gradually increase according to a number of times the program pulse operation is performed. The program verify operation may be an operation of applying a program verify voltage to the word line connected to the page and applying a program verify pass voltage to the other word lines.

In an embodiment, a level of the intermediate verify voltage Vvt may be equal to a level of a fourth verify voltage Vvc4 using the TLC method or be lower than the level of the fourth verify voltage Vvc4 using the TLC method.

In an embodiment, the operation controller 131 may control the peripheral circuit 120 to perform the secondary program operation 530 of additionally storing the MSB data and the CSB data in one page, based on the LSB data stored in one page.

In an embodiment, the secondary program operation 530 may include a recovery operation. The recovery operation may be an operation of reading page data stored in a page. For example, the stored page data may be LSB data. This is for the purpose of accurately identifying which program state among eight program states P0 to P7 a program state corresponding to three page data to be finally stored in a memory cell is, by combining one page data stored in the page and the other page data (page data to be stored in the page). For example, the operation controller 131 may control the peripheral circuit 120 to apply an intermediate read voltage Vrt to a word line connected to the page and to apply a read pass voltage to the other word lines. The control logic 130 may determine that a memory cell having a threshold voltage higher than the intermediate read voltage Vrt has the intermediate program state Pt, and determine that a memory cell having a threshold voltage lower than the intermediate read voltage Vrt has the zeroth program state P0. For example, the intermediate program state Pt may represent a value of 0, and the zeroth program state P0 may represent a value of 1.

In an embodiment, a level of the intermediate read voltage Vrt may be equal to the level of the intermediate verify voltage Vvt or be less than the level of the intermediate verify voltage Vvt.

In an embodiment, the operation controller 131 may control the peripheral circuit 120 to read page data stored in a page through a recovery operation. The page data may be LSB data. The operation controller 131 may control the peripheral circuit 120 to program the page by using the page data read according to the recovery operation and the other page data. For example, the other page data may include CSB data and MSB data. For example, the operation controller 131 may determine which one of the zeroth program state P0 and the intermediate program state Pt a program state of a memory cell is through the recovery operation.

The operation controller 131 may control the peripheral circuit 120 to program memory cells having the zeroth program state P0 such that the program state of the memory cell becomes one target program state among program states P0 to P3 obtained by combining the other page data (e.g., CSB data and MSB data). Meanwhile, the operation controller 131 may control the peripheral circuit 120 to program memory cells having the intermediate program state Pt such that the program state of the memory cell becomes one target program state among program states P4 to P7 obtained by combining the other page data (e.g., CSB data and MSB data).

In accordance with an embodiment of the present disclosure, when a plurality of page data are received, the operation controller 131 may control the peripheral circuit 120 to distributively store the plurality of page data in a plurality of pages. The plurality of page data may be TLC data.

For example, when first TLC data is received, the operation controller 131 may control the peripheral circuit 120 to perform the primary program operation 520 of storing, in a second page, first MSB data included in the first TLC data as LSB data, and to perform a program operation of storing, in a first page, first CBS data and first LSB data, which are included in the first TLC data. The program operation of storing the first CSB data and the first LSB data in the first page may be one of the program operation using the MLC method and the secondary program operation using the TLC method according to a stage of the program operation.

Also, when second TLC data is received, the operation controller 131 may control the peripheral circuit 120 to perform a program operation of storing, in a third page, second MSB data included in the second TLC data, and to perform the secondary program operation 530 of storing, in the second page, second CSB data and second LSB data, which are included in the second TLC data. The program operation of storing the second MSB data in the third page may be one of the program operation using the SLC method and the primary program operation 520 using the TLC method according to a stage of the program operation.

As described above, after a plurality of page data for the first page are all received, thereby performing the primary program operation 520 on the second page, the secondary program operation 530 on the first page is performed, so that an interference phenomenon of a continuous program operation and a bottleneck phenomenon between data transmissions can be prevented. In addition, the interference phenomenon and the bottleneck phenomenon can be prevented without any logic change of the memory controller 200. Moreover, according to the secondary program operation 530, additional page data can be stored in the first page without having influence on a value of page data pre-stored in the first page.

FIG. 6 is a diagram illustrating a program operation and map information for each stage in accordance with an embodiment of the present disclosure.

Referring to FIGS. 3 to 6, a table 600 represents a position at which each page data is to be actually stored, a type of which each page data is programmed, and an order in which each page data is programmed, when a program command is received from the memory controller 200 such that a plurality of page data MSB data, CSB data, and LSB data are sequentially stored in each of first to nth pages PG1 to PGn of the memory device 100.

When a program command is received, the control logic 130 of the memory device 100 may determine a stage of a program operation. The stage of the program operation may be one of a program start stage, a program intermediate stage, and a program end stage.

In an embodiment, the control logic 130 may determine the stage of the program operation is one of the program start stage, the program intermediate stage, and the program end stage by using flag information. For example, the control logic 130 may determine a stage of the program operation through the flag information included in a program command received from the memory controller 200. The flag information may be information stored in a partial area of the program command. In another example, when a program command and flag information are received from the memory controller 200, the control logic 130 may determine a stage of the program operation through the flag information. The flag information may be information separate from the program command.

The flag information may include information representing a stage of the program operation. The flag information may be generated in the memory controller 200. In an embodiment, the flag information may include bit information. A bit value of the bit information may represent each stage of the program operation. For example, the flag information may have a bit value of 0 or 1. When flag information having a bit value of 1 and a program command are first received from the memory controller 200, the control logic 130 may determine the stage of the program operation as the program start stage. After that, when flag information having a bit value of 0 and a program command are received from the memory controller 200, the control logic 130 may determine the stage of the program operation as the program intermediate stage. After that, when flag information having a bit value of 1 and a program command are received from the memory controller 200, the control logic 130 may determine the stage of the program operation as the program end stage. However, this is merely an embodiment, and the bit value may be variously modified and embodied.

In the program start stage, the control logic 130 may be consecutively receive a program command for the first page PG1 and a plurality of page data LSB data, CSB data, and MSB data for a first page PG1. In an embodiment, the control logic 130 may consecutively receive, from the memory controller 200, a program command, a first address of the first page PG1, the plurality of page data LSB data, CSB data, and MSB. The first page PG1 may be connected to a first word line WL1.

Also, the control logic 130 may program a second page PG2, based on one page data for the first page PG1. The second page PG2 may be a next page adjacent to the first page PG1. The second page PG2 may be connected to a second word line WL2.

Specifically, the control logic 130 may program the second page such that each of memory cells included in the second page PG has a program state corresponding to the one page data for the first page PG1, which is selected from the zeroth program state P0 and the intermediate program state Pt. For example, the one page data for the first page PG1 may be MSB data for the first page PG1.

The MSB data for the first page PG1 may be stored as LSB data using the TLC method 430 in the second page PG2. In an embodiment, the control logic 130 may store, in the map storage 135, map information representing a mapping relationship between the MSB data for the first page PG1 and the LSB data for the second page PG2.

Also, the control logic 130 may program the first page PG1, based on the other page data for the first page PG1.

Specifically, the control logic 130 may program the first page PG1 such that each of memory cells included in the first page PG1 has a program state corresponding to the other page data for the first page PG1 among the program states P0 to P3 using the MLC method 420. For example, the other page data for the first page PG1 may include CSB data and LSB data for the first page PG1.

The CSB data and the LSB data for the first page PG1 may be stored as MSB data and LSB data in the first page PG1 according to the MLC method 420. In an embodiment, the control logic 130 may store, in the map storage 135, map information representing a mapping relationship between the CSB data for the first page PG1 and the MSB data for the first page PG1 and a mapping relationship between the LSB data for the first page PG1 and the LSB data for the second page PG2.

In the program intermediate stage, the control logic 130 may consecutively receive, from the memory controller 200, a program command for a second page PG2 and a plurality of page data LSB data, CSB data, and MSB data for the second page PG2.

Also, the control logic 130 may program a third page PG3, based on one page data for the second page PG2. The third page PG3 may be a next page adjacent to the second page PG2. The third page PG3 may be connected to a third word line WL3.

Specifically, the control logic 130 may program the third page PG3 such as each of memory cells included in the third page PG3 has a program state corresponding to the one page data for the second page PG2, which is selected from the zeroth program state P0 and the intermediate state Pt. For example, the one page data for the second page PG2 may be MSB data for the second page PG2.

The MSB data for the second page PG2 may be stored as LSB data using the TLC method 430 in the third page PG3. In an embodiment, the control logic 130 may store, in the map storage 135, map information representing a mapping relationship between the MSB data for the second page PG2 and the LSB data for the third page PG3.

Also, the control logic 130 may program the second page PG2, based on the other page data for the second page PG2.

Specifically, the control logic 130 may program the second page PG2 such that each of the memory cells included in the second page PG2 has a program state corresponding to previous page data representing program states of the memory cells included in the second page PG2 and the other page data among program states P0 to P7 using the TLC method 430.

For example, the other page data for the second page PG2 may include LSB and CSB data for the second page PG2. The previous page data may be one page data stored in the second page PG2 through the primary program operation 520 using the TLC method 430 in a previous stage. The previous page data may be MSB data for the first page PG1.

The previous page data may be read through a recovery operation of applying the intermediate read voltage Vrt to the second page PG2.

The CSB and LSB data for the second page PG2 and the MSB data for the first page PG1 may be stored as CSB data, MSB data, and LSB data in the second page PG2 according to the TLC method 430. In an embodiment, the control logic 130 may store, in the map storage 135, map information representing a mapping relationship between data.

The control logic 130 may sequentially perform operations in the same manner as described above with respect to page data for another page belonging to the program intermediate stage.

In the program end stage, the control logic 130 may be consecutively receive, from the memory controller 200, a program command for an nth page PGn and a plurality of page data LSB data, CSB data, and MSB data for the nth page PGn. The nth page PGn may represent a page connected to an nth word line WLn.

Also, the control logic 130 may program an (n+1)th page PGn+1, based on one page data for the nth page PGn. The (n+1)th page PGn+1 may be a next page adjacent to the nth page PGn. The (n+1)th page PGn+1 may be connected to an (n+1)th word line WLn+1.

Specifically, the control logic 130 may program the (n+1)th page PGn+1 such that each of memory cells included in the (n+1)th page PGn+1 has a program state corresponding to one page data among the program states using the SLC method 410. For example, the one page data for the nth page PGn may be MSB data for the nth page PGn.

The MSB data for the nth page PGn may be stored as SLC data using the SLC method 410 in the (n+1)th page PGn+1. In an embodiment, the control logic 130 may store, in the map storage 135, map information representing a mapping relationship between the MSB data for the nth page PGn and the SLC data for the (n+1)th page PGn+1.

In an embodiment, each of the first to nth pages PG1 to PGn may be a normal page, and the (n+1)th page PGn+1 may be a dummy page. The normal page is an area in which normal data can be stored, and the dummy data may be a preliminary page except the normal page.

Also, the control logic 130 may program the nth page PGn such as each of memory cells included in the nth page PGn has a program state corresponding to previous page data representing program states of the memory cells included in the nth page PGn and the other page data for the nth page PGn among the program states P0 to P7 using the TLC method 430.

For example, the other page data for the nth page PGn may include LSB and CSB data for the nth page PGn. The previous page data may be one page data stored in the nth page PGn through the primary program operation 520 using the TLC method 430 in a previous stage. The previous page data may be MSB data for an (n−1)th page PGn−1. The previous page data may be read through a recovery operation of applying the intermediate read voltage Vrt to the nth page PGn.

The CSB and LSB data for the nth page PGn and the MSB data for the (n−1)th page PGn−1 may be stored as CSB data, MSB data, and LSB data in the nth page PGn according to the TLC method 430. In an embodiment, the control logic 130 may store, in the map storage 135, map information representing a mapping relationship between data.

When a read command for reading any one page data is received, the control logic 130 may control the peripheral circuit 120 to read page data of a corresponding page, based on the map information.

For example, when a read command for controlling the peripheral circuit 120 to read MSB data for the first page PG1 is received from the memory controller 200, the control logic 130 may read LSB data for the second page PG2, which corresponds to the MSB data for the first page PG1, and transmit the read LSB data as the MSB data for the first page PG1 to the memory controller 200. That is, a position at which actual data is stored can be accurately detected.

Figure 7:
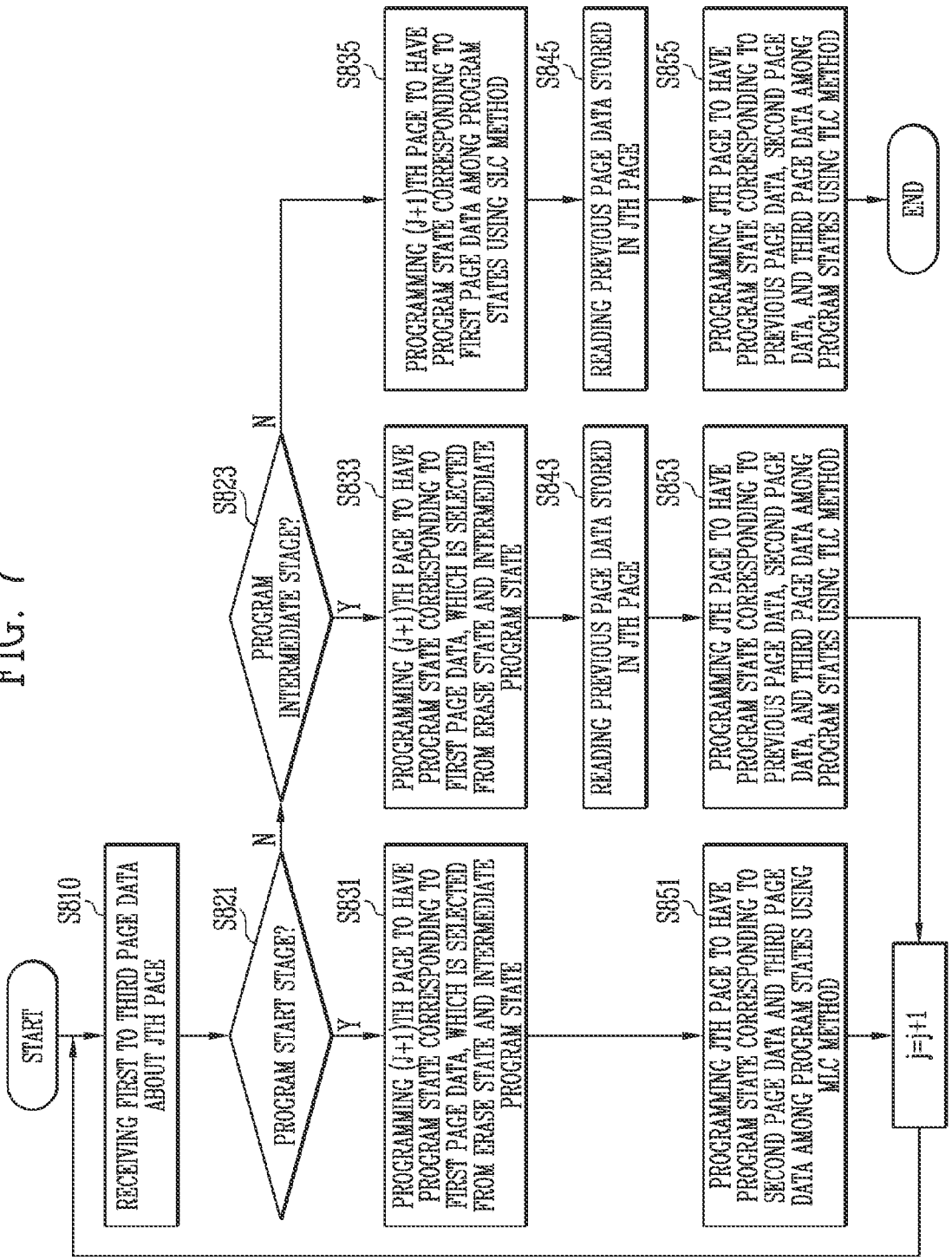
FIG. 7 is a flow chart illustrating a method of operating a memory device in accordance with an embodiment of the present disclosure.

FIG. 7 is a diagram illustrating an operating method of the memory device in accordance with an embodiment of the present disclosure.

Referring to FIG. 7, in the operating method of the memory device 100 in accordance with the embodiment of the present disclosure, a program command and first to third page data for a first page may be received from the memory controller 200 (S810). For example, the first to third page data may include LSB data, CSB data, and MSB data.

In the operating method of the memory device 100, a second page as a next page of the first page may be programmed, based on the first page data (S831, 833, and 835). For example, the first page data may be MSB data.

In the operating method of the memory device 100, the first page may be programmed based on the second page data and third page data (S851, S853, and S855). For example, the second page data and the third page data may include LSB data and CSB data.

Specifically, in the step S810, a program command and first to third page data for a jth page are received from memory controller 200. Here, j may be a natural number. For example, the first to third page data may include LSB data, CSB data, and MSB data.

In an embodiment, when the program command or the jth page represents a program start stage (S821-Y), in the step S831, a (j+1)th page may be programmed such that each of memory cells included in the (j+1)th page has a program state corresponding to the first page data, which is selected from an intermediate program state and an erase state. For example, the first page data may be MSB data.

In step S851, the jth page may be programmed such that each of memory cells included in the jth page has a program state corresponding to the second page data and the third page data among program state using an MLC method. For example, the second page data and the third page data may include LSB data and CSB data.

In an embodiment, when the program command or the jth page represents a program intermediate stage (S821-N and S823-Y), in the step S833, the (j+1)th page may be programmed such that each of the memory cells included in the (j+1)th page has a program state corresponding to the first page data, which is selected from an intermediate state and an erase state.

In step S843, after the (j+1)th page is programmed, previous page data stored in the jth page may be read.

In the step S853, the jth page may be programmed such that each of the memory cells included in the jth page has a program state corresponding to the previous page data, the second page data, and the third page data among program states using a TLC method.

In an embodiment, when the program command or the jth page represent a program end stage (S821-N and S823-N), in the step S835, the (j+1)th page may be programmed such that each of the memory cells included in the (j+1)th page has a program state corresponding to the first page data among program states using an SLC method.

In step S845, after the (j+1)th page is programmed, previous page data stored in the jth page may be read.

In the step S855, the jth data may be programmed such that each of the memory cells included in the jth page has a program state corresponding to the previous page data, the second page data, and the third page data among the program states using the TLC method.

Those of ordinary skill will appreciate that shortcomings of prior art memory devices and methods of operating them to reduce word-line to word-line interference can be avoided by the memory device and an operating method disclosed herein. Word-line interference programming bottlenecks are reduced without requiring logic changes to a memory controller. Programming speed can be increased without a buffer memory.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory device comprising:
   a memory cell array including a plurality of pages;
   a peripheral circuit configured to perform a program operation; and
   a control logic configured to control the peripheral circuit to, when a program command for a first page among the plurality of pages is received and a plurality of page data including first page data, second page data, and third page data are received, program a second page based on the first page data, and program the first page based on the second page data and the third page data after programming the second page, according to a stage of the program operation,
   wherein the control logic comprises an operation controller;
   wherein the operation controller is configured to:
   determine a program method for each of the first page and the second page according to the stage of the program operation; and
   program the second page such that each memory cell included in the second page has a program state, corresponding to the first page data, which is selected from an intermediate program state and an erase state, when the program command represents a program start stage.

2. The memory device of claim 1, wherein, when the stage of the program operation is the program start stage, the operation controller is further configured to:
   program the first page such that each memory cell included in the first page has a program state, corresponding to the second page data and the third page data, which is selected from among program states using a Multi-Level Cell (MLC) method.

3. The memory device of claim 1, wherein, when the stage of the program operation is a program intermediate stage, the operation controller is further configured to:
   program the second page such that each memory cell included in the second page has a program state, corresponding to the first page data, which is selected from an erase state and an intermediate program state; and
   program the first page such that each of memory cells included in the first page has a program state, corresponding to previous page data representing program states of the memory cells included in the first page and the second page data and the third page data, which is selected from among program states using a Triple Level Cell (TLC) method.

4. The memory device of claim 3, wherein the operation controller is further configured to program the second page by using an intermediate verify voltage such that memory cells corresponding to a first value of the first page data among the memory cells included in the second page have the intermediate program state.

5. The memory device of claim 4, wherein the program states using the TLC method include program states corresponding to combinations of Least Significant Bit (LSB) data, Central Significant Bit (CSB) data, and Most Significant Bit (MSB) data.

6. The memory device of claim 5, wherein a level of the intermediate verify voltage is equal to or lower than a level of a verify voltage for verifying a program state corresponding to the LSB data.

7. The memory device of claim 4, wherein the operation controller is further configured to control the peripheral circuit to perform a read operation of reading the previous page data stored in the first page by using an intermediate read voltage having a level equal to or lower than a level of the intermediate verify voltage, after the second page is programmed.

8. The memory device of claim 1, wherein, when the stage of the program operation is a program end stage, the operation controller is further configured to:
   program the second page such that each memory cell included in the second page has a program state, corresponding to the first page data, which is selected from among program states using a Single Level Cell (SLC) method; and
   program the first page such that each of memory cells included in the first page has a program state, corresponding to page data representing program states of the memory cells included in the first page and the second page data and the third page data, which is selected from among program states using a Triple Level Cell (TLC) method.

9. The memory device of claim 8, wherein the first page is a normal page, and the second page is a dummy page.

10. The memory device of claim 1, wherein the control logic includes:
- a map storage configured to store map information representing an address of a page in which page data is stored; and
- the operation controller further configured to control the peripheral circuit to, when a read command for reading the first page data and an address of the first page are received, identify an address of a page in which the first page data is stored in the map information and read a page corresponding to the identified address.

11. The memory device of claim 1, wherein the operation controller is further configured to determine that the stage of the program operation is one of a program start stage, a program intermediate stage, and a program end stage by using flag information.

12. The memory device of claim 11, wherein the flag information is included in the program command, or is received together with the program command from the memory controller.

13. A method of operating a memory device, the method comprising:
- receiving from a memory controller, a program command and first to third page data for a first page;
- determining a program method for each of the first page and the second page according to a stage of the program operation represented by the program command,
- programming a second page corresponding to a next page of the first page, based on the first page data; and
- programming the first page, based on the second page data and the third page data,
- wherein the programming the second page comprises, programming the second page such that each memory cell included in the second page has a program state, corresponding to the first page data, which is selected from an intermediate program state and an erase state, when the program command represents a program start stage.

14. The method of claim 13, wherein the programming the first page comprises, programming the first page such that each of memory cells included in the first page has a program state, corresponding to the second page data and the third page data, which is selected from among program states using a Multi-Level Cell (MLC) method.

15. The method of claim 13, wherein the programming the second page comprises, programming the second page such that each of memory cells included in the second page has a program state, corresponding to the first page data, which is selected from an intermediate program state and an erase state, when the program command represents a program intermediate stage.

16. The method of claim 15, further comprising:
- reading previous page data stored in the first page, after the second page is programmed,
- wherein the programming the first page comprises, programming the first page such that each of memory cells included in the first page has a program state, corresponding to the previous page data, the second page data, and the third page data, which is selected among program states using a Triple Level Cell (TLC) method.

17. The method of claim 13, wherein the programming the second page comprises, programming the second page such that each of memory cells included in the second page has a program state, corresponding to the first page data, which is selected from among program states using a Single Level Cell (SLC) method, when the program command represents a program end stage.

18. The method of claim 17, further comprising:
- reading previous page data stored in the first page, after the second page is programmed,
- wherein the programming the first page comprises, programming the first page such that each of memory cells included in the first page has a program state, corresponding to the previous page data, the second page data, and the third page data, which is selected from among program states using a Triple Level Cell (TLC) method.

* * * * *